US011328489B2

(12) United States Patent
Antypov

(10) Patent No.: US 11,328,489 B2
(45) Date of Patent: *May 10, 2022

(54) AUGMENTED REALITY USER INTERFACE INCLUDING DUAL REPRESENTATION OF PHYSICAL LOCATION

(71) Applicant: Inspirium Laboratories LLC, Raleigh, NC (US)

(72) Inventor: Iegor Antypov, Kharkov (UA)

(73) Assignee: Inspirium Laboratories LLC, Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,290

(22) Filed: Jun. 30, 2020

(65) Prior Publication Data

US 2020/0334912 A1  Oct. 22, 2020

Related U.S. Application Data

(63) Continuation of application No. 16/102,479, filed on Aug. 13, 2018, now Pat. No. 10,706,630.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01); *G06T 2219/028* (2013.01)

(58) Field of Classification Search
CPC ... G06T 3/4038; G06T 3/0062; G06T 3/0093; G06T 11/60; G06T 19/006; G06F 17/30061; G06F 3/011; G06F 3/012; G06F 3/013; G06F 3/014; G06F 3/015
See application file for complete search history.

(56) References Cited

U.S. PATENT DOCUMENTS

| | | | |
|---|---|---|---|
| 9,151,634 B2* | 10/2015 | Ann | G01C 21/3697 |
| 2011/0279446 A1* | 11/2011 | Castro | G06T 15/20 345/419 |
| 2013/0314398 A1 | 11/2013 | Coates et al. | |
| 2014/0063058 A1* | 3/2014 | Fialho | G06T 19/00 345/633 |
| 2015/0248792 A1 | 9/2015 | Abovitz et al. | |
| 2016/0148417 A1 | 5/2016 | Kim et al. | |
| 2016/0371884 A1 | 12/2016 | Benko et al. | |
| 2017/0069122 A1 | 3/2017 | Lee et al. | |
| 2017/0103574 A1 | 4/2017 | Faaborg et al. | |
| 2019/0251752 A1* | 8/2019 | Rodriguez, II | G06T 19/006 |

* cited by examiner

*Primary Examiner* — Diane M Wills
(74) *Attorney, Agent, or Firm* — Myers Bigel, P.A.

(57) ABSTRACT

There is disclosed an augmented reality user interface including dual representation of a physical location including generating two views for viewing the augmented reality objects, a first view includes the video data of the view including the augmented reality objects superimposed thereover in augmented reality locations and a second view that includes data derived from the physical location to generate a map with the augmented reality objects from the first view visible as objects on the map in the augmented reality locations, combining the location, the motion data, the video data, and the augmented reality objects into an augmented reality video such that when the computing device is in a first position, the first view is visible and when the computing device is in a second position, the second view is visible, and displaying the augmented reality video on a display.

20 Claims, 6 Drawing Sheets

AUGMENTED REALITY USER INTERFACE INCLUDING DUAL REPRESENTATION OF PHYSICAL LOCATION

CROSS-REFERENCE TO RELATED APPLICATION

The present application is a continuation of U.S. patent application Ser. No. 16/102,479, filed on Aug. 13, 2018, in the United States Patent and Trademark Office, the entire contents of which are incorporated by reference as if set forth herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to augmented and mixed reality user interfaces.

Description of the Related Art

Augmented reality has risen dramatically in popularity in the last several years, both among consumers and developers. While virtual reality technology has been around for many years, it has recently had a resurgence with the increasing availability of high-quality motion sensors and high-resolution screens suitable for virtual reality headsets. The same general sets of technology may be used for either virtual reality or augmented reality. Access to augmented reality systems, as simple as the ubiquitous smartphone or as complex as computer-integrated headsets, is now common.

The primary distinction between virtual reality and augmented reality is that augmented reality incorporates some aspects of the exterior, physical world with virtual or "augmented" virtual objects within the world. In the simplest experiences, this may be a map or physical layout of the real world, either in three-dimensional form or in two-dimensional form. In more complex experiences, characters or other virtual objects may be interposed within the physical world. This type of augmented reality experience is sometimes referred to as "mixed reality" because it mixes the virtual and the physical worlds visibly within a scene (e.g. a virtual Mickey Mouse standing next to you in a Disney® store). Virtual reality, in contrast, generally means that the entire virtual world shown on a virtual reality headset or other viewing device is computer-generated. In virtual reality, there is no (or very limited) reproduction of the actual, physical world. In conformity with this understanding, as used herein the phrase "augmented reality" means a mixture of data regarding the physical world with computer-generated objects interposed thereon. This data may be video data (e.g. a video stream of the video in front of a camera capturing images of the physical world) or map data that is representative of the physical world. At a minimum, as used herein, "augmented reality" includes a video stream of the physical world captured by a camera in addition to computer-generated objects interposed thereon.

The most well-known augmented reality experience in the U.S. is the Pokemon Go® game. In this game, a user may be notified via an application on one's phone or otherwise that Pokemon (which are monsters one "collects" so as to "train" them to fight other monsters) are in a particular location. The location is presented as a "map" of the real world, and once a user moves toward the Pokemon, it may be captured. In other locations, there may be "battles" available for one's Pokemon. This user interaction was somewhat basic, involving no real-world video component. Instead, it relied upon only the map of the physical world, and utilized in-game computer-generated graphics for the Pokemon battles and capture scenarios. As a result, its interaction with the real world is quite limited. Other than requiring that a user be in a particular location to perform actions, it includes limited interaction with that physical location.

Other experiences involve the interposition of characters or avatars into the real world in an arbitrary position. Experiences may involve a familiar cartoon character "standing" in front of one's couch in one's living room. The position for that character in such experiences is often chosen based merely upon the direction a particular user was looking when he or she donned an augmented reality headset. More complex systems, such as Google's Project Tango (and similar systems) may use infrared or other technologies to detect walls and objects. In these cases, the character may be "intelligently" placed such that it is not occupying the same space as a couch or chair or wall, but is "in" a realistic position within the room, given the distance at which the character is supposed to be from the viewer.

Still, all of these types of experiences fail to truly integrate with the physical world in a way that makes it seem to a viewer or individual (or group) experiencing the augmented reality that the virtual objects really are permanent fixtures or "present" and "acting" within the physical world. The more "grounded" in reality these virtual objects can be, the better the augmented reality experiences are for users and viewers.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
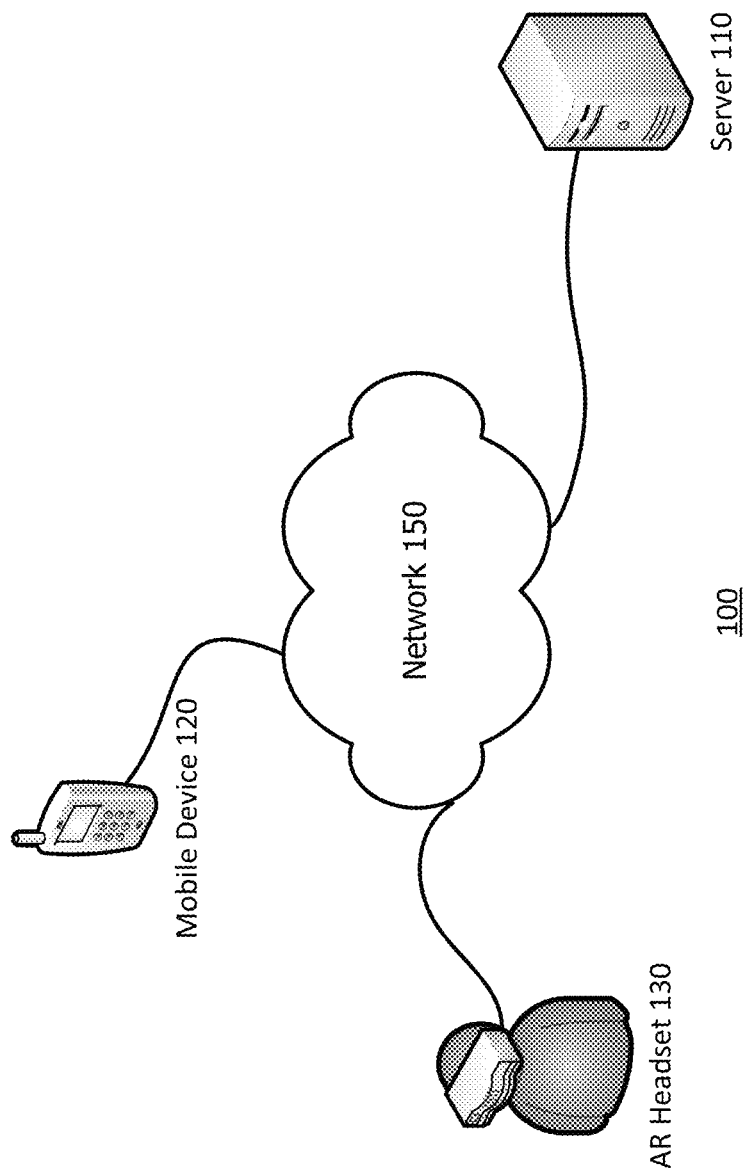
FIG. 1 is a block diagram of a system for an augmented reality user interface.
Figure 2:
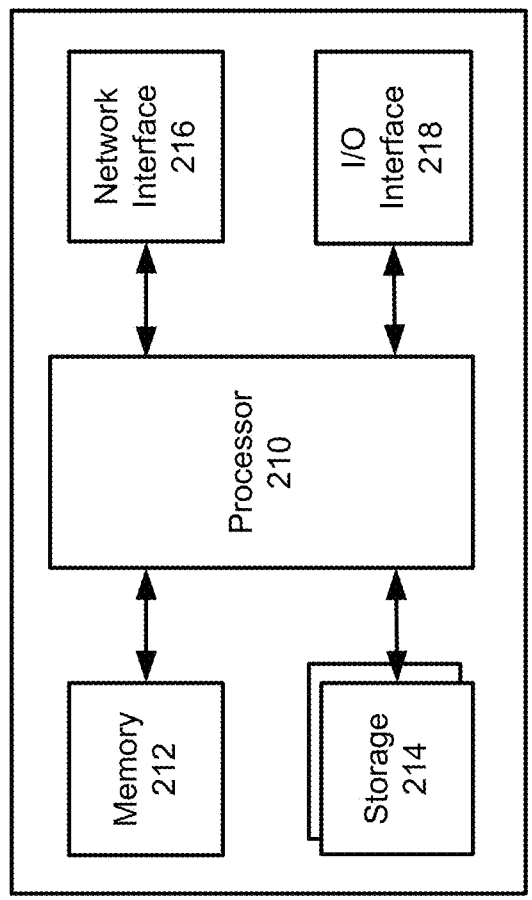
FIG. 2 is a block diagram of a computing device.

Referring now to FIG. 1, a block diagram of a system for an augmented reality user interface is shown. The system includes a server 110, a mobile device 120, and an augmented reality ("AR") headset 130 which may be interconnected by a network 150. Each of these devices is or is a part of a computing device (FIG. 2).

The server 110 may be optional in some cases. In situations in which a server 100 is used, it is a computing device for "serving" the augmented reality experiences to, for example, the mobile device 120 and AR headset 130. The server coordinates virtual objects to be shared amongst augmented reality software users. In particular, the server 110 may be used to store the location, orientation (e.g. direction an object is facing), and any movement of a virtual object that is to be interposed within an augmented reality experience.

The server 110 may also maintain a secure authentication process to ensure that user accounts and devices are properly registered and able to use the augmented reality system while non-registered users or otherwise unauthorized users cannot. The user accounts on the server 110 may be used to track statistics, settings, or other data related to an augmented reality experience such as a user level, weapons, weapon capabilities, player attributes, player movement histories, etc. The data stored by the server 110 may vary dependent upon the type of augmented reality experience or game that is being served.

The mobile device 120 is a smartphone or other similar computing device including an inertial measurement unit, a global positioning system (GPS) or similar system, a display and a camera. While augmented reality systems may rely upon dedicated hardware, such as augmented reality headsets, the most common augmented-reality capable device is the modern smartphone. It incorporates all the necessary elements to provide an augmented reality software experience to a user, and its ubiquity makes it an ideal choice for such a task. In an augmented reality experience, which may be a part of a mobile application installed on the mobile device 120, the user's movement of the mobile device 120 may be translated into movement within both the physical world and the virtual world, causing the images displayed on the camera to update accordingly.

The augmented reality headset 130 is a computing device (or integrated with a computing device such as a desktop computer) that is dedicated to providing augmented reality experiences. As a practical matter, its general components, functions, and capabilities are similar to those of the mobile device 120, but it may be in a form factor or include or have access to (e.g. wired or wirelessly) higher-quality hardware or software to enable it to function as an augmented reality device.

The network 150 is a computer network whereby data, such as data packets, may be transferred between the server 110, mobile device 120, augmented reality headset 130, and other similar devices. Numerous other augmented reality headsets 130 and mobile devices 120 may be interconnected or operating with respect to each other or the server 110. And any number of these devices may communicate using the network 150. The network may be or include the internet, and may rely upon wireless internet (e.g. 802.11x wireless networks), Bluetooth®, cellular networks, and other telephonic data networks.

Turning now to FIG. 2 there is shown a block diagram of a computing device 200, which is representative of the server 110, the mobile device 120, and the augmented reality headset 130 in FIG. 1. The computing device 200 may be, for example, a desktop or laptop computer, a server computer, a tablet, a smartphone or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 212, storage 214, a network interface 216 and an I/O interface 218. The processor 210 may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210. As used herein the term "memory" corresponds to the memory 212 and explicitly excludes transitory media such as signals or waveforms.

The storage 214 provides non-volatile, bulk or long-term storage of data or instructions in the computing device 200. The storage 214 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" correspond to the storage 214 and explicitly exclude transitory media such as signals or waveforms. In some cases, such as those involving solid state memory devices, the memory 212 and storage 214 may be a single device.

The network interface 216 includes an interface to a network such as network 150 (FIG. 1). The network interface 216 may be wired or wireless.

The I/O interface 218 interfaces the processor 210 to peripherals (not shown) such as displays, video and still cameras, microphones, keyboards and USB devices.

Figure 3:
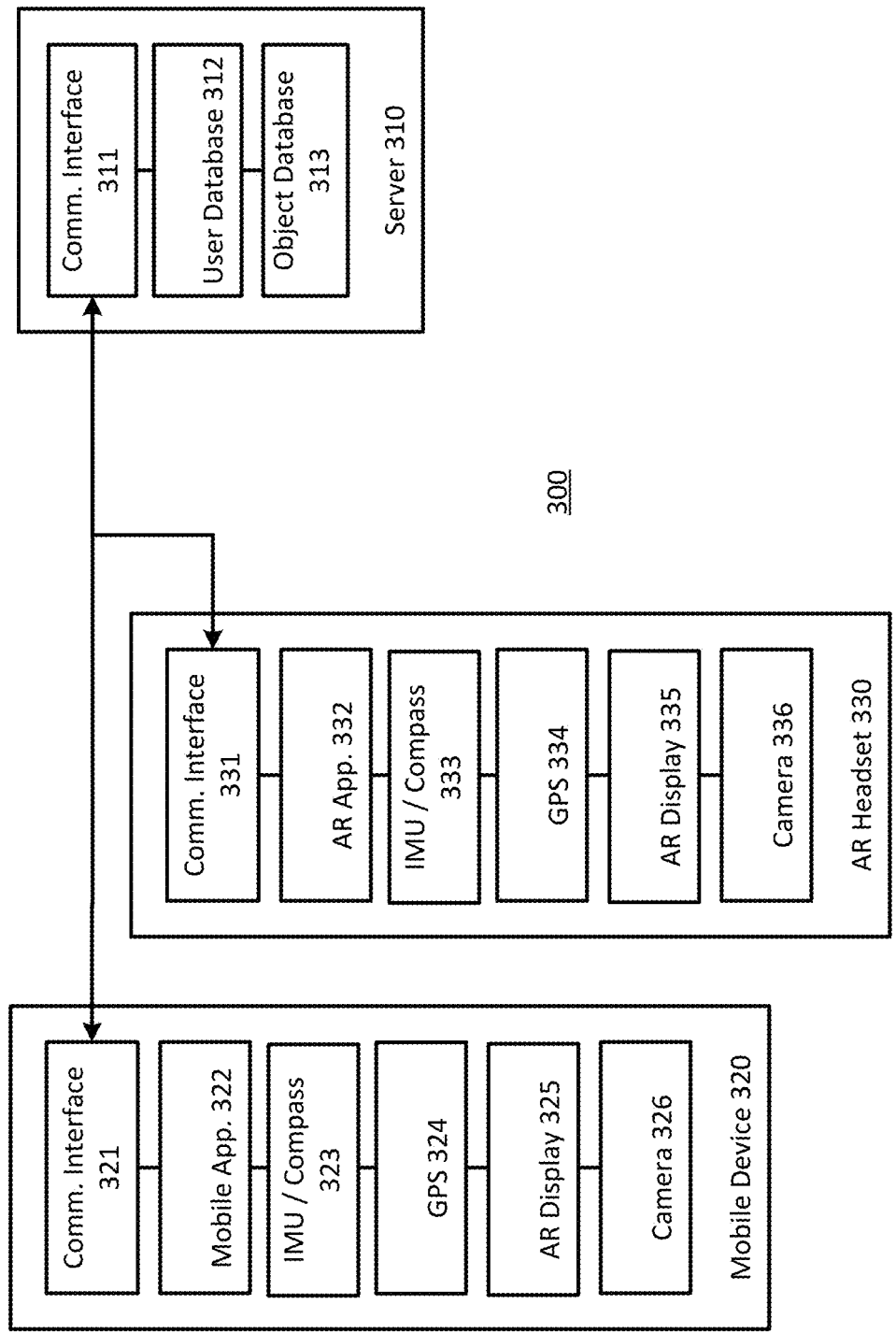
FIG. 3 is a functional, block diagram of a system for an augmented reality user interface.

FIG. 3 is a functional, block diagram of a system for an augmented reality user interface. FIG. 3 shows the functional components, which may or may not be physical components, in the server 310, the mobile device 320, and the AR headset 330, which correspond to the server 110, mobile device 120, and the AR headset 130 in FIG. 1.

The server 310 includes a communications interface 311 which enables communication by the server with and to the mobile device 320 and the AR headset 330. The communications interface 311 may include specialized data structures for use in communicating location data, authentication data, and other information related to the interactions between the server 310 and the mobile device 320 and AR headset 330.

The server 310 also includes a user database 312 that may include authentication credentials for users of the server 310. For example, these users may be the users of the mobile device 320 and the AR headset 330, and any other users of similar devices. In cases in which a server like server 310 is used at all, authentication may be required to ensure access by a particular user at a location. Authentication may also enable functionality of associated applications or games. These experiences may be subscription based or include in-app purchases, communication capabilities with other players or users. As a result, the associated servers and systems may wish to provide services only to particular users. The user database 312 maintains and stores that data. The user database 312 may also receive location data from the various devices to which it communications. That data may be used to enable some of the functionalities of the server 310 and augmented reality systems described herein.

The server 310 also includes an object database 313. This database maintains and stores the characteristics of virtual objects within the augmented reality world. This database may, in some cases, instead be on each individual mobile device 320 and AR headset 330. The object database 313 in particular may store object data including characteristics of the objects such as "health" or "hit points," names, animations, scripting or other software that controls the actions of the objects (e.g. characters or ships or other vehicles).

The object database may also maintain a set of "locations" where the virtual objects are within the world. These locations may be fixed or moving, and one of the sets of object data may be speeds and headings, walking, and any turning or other actions taken by the objects. These locations may be defined using global positioning system (GPS) coordinates, latitude and longitude measurements or numbers, or any other method for setting a fixed (at a given time) location within the physical world. Though the objects are virtual, in the sense that they do not exist in the physical world, for purposes of this patent, the objects each have a fixed location where those objects are within the physical world. In this way, a viewer, using an augmented reality viewing device, such as the mobile device 320, can use that device to see the virtual object at its location in the physical world. As that virtual object moves, turns, performs actions, speaks, walks, and the like, the viewer can see those actions too.

The server 310 is used to store this location data in the object database 313 so that, for example, a group of users, each with a mobile device 320, may "see" the same object in the same physical location, in the same orientation, performing the same action or movement or animation at the same time. In this way, the object is better-tied to the physical world, thereby increasing realism and immersion for each of the users.

In some applications, the object database 313 may, instead, be on each mobile device 320 or AR headset 330. In these cases, the locations of virtual objects within the physical world may not be shared between devices or, may be shared, but only through local peer-to-peer processes (e.g. two users on the same wireless network may have their object databases 313 continually synchronized between devices) or through the use of a "friend" mechanic whereby users may be "friends" with one another in an associated application and those users may together share an object database 313, which may be maintained on one or both user's devices using a network connection, like network 150 (FIG. 1) between the two.

In still other applications, the object database 313 may be fully self-contained on each mobile device 320 or AR headset 330 such that no network connectivity is required. In such cases, the application may be "single player" meaning that the augmented reality objects are only present for a single player but have all of the other attributes described. Or, alternatively, the augmented reality objects may be synchronized periodically, but not continuously, using the network only when, for example, 802.11x wireless is available or on an hourly or daily basis so as to conserve network bandwidth. The use of a network is optional for enabling the systems and processes described herein.

The mobile device 320 includes a communications interface 321, mobile application 322, inertial measurement unit/compass 323, global positioning system (GPS) 324, an AR display 325, and a camera 326.

The communications interface 321 enables the mobile device 320 to communicate with the server 310 and, in some cases, the AR headset 330 using the network 150 (FIG. 1). The communication interface 321 may be hardware and/or software including one or more types of network interfaces, which may themselves be integrated into a combined communications microchip. The software may utilize standard wired and wireless communications protocols or may be customized for a particular type of interaction or data (e.g. for AR-related data).

The mobile application 322 is an application that includes augmented reality functionality. The mobile application 322 may be a stand-alone application, for example, an application that only or primarily provides augmented reality functionality such as an augmented reality game, an augmented reality experience, an informational application that uses augmented reality to provide information about a location, an augmented reality "guide" person or avatar, or otherwise to an application that's primary purpose is to "augment" the nearby, visible reality in some way. Alternatively, the mobile application 322 may be a web browser that implements an augmented reality application or web-based augmented reality application. The mobile application 322 may be an application with a primary purpose other than providing an augmented reality experience (e.g. a bank application, a map application, a messaging application, etc.) that also provides an augmented reality functionality to its users.

The mobile application 322, at a minimum, generates augmented reality experiences from a view of physical world images captured by the camera in addition to augmented reality content. The mobile application 322 may rely upon other components of the mobile device 320 that provide information regarding the surroundings of the environment and the movement of the mobile device 320 within those surroundings to generate the augmented reality experiences. Those components will be discussed more fully below.

The inertial measurement unit (IMU)/compass 323 is written as though they are an integrated unit because, in most cases, they are. Inertial measurement units have become quite common in the virtual reality and augmented reality space. They are generally an integrated, hardware component that incorporates a gravitometer, one or more gyroscopes, and that may also include more-specialized hardware such as altimeters, barometers, and other sensors. Often, a compass is incorporated into the inertial measurement unit system-on-a-chip, so, the component is shown here as an IMU/compass 323 incorporating both. A compass is usually a digital compass with a magnet floating in a liquid or otherwise with significantly-reduced friction so that the cardinal direction North may always be determined. This information may be used to enable the IMU/compass 323 to output, periodically, the direction currently being "faced" by the mobile device. In particularly thorough implementations, multiple sets of IMUs may be used, or a single IMU/compass 323 may include multiple sets of sensors such as gyroscopes.

The IMU/compass 323 typically incorporates a known output of sensor readouts on a clock schedule (e.g. each CPU cycle for the associated system-on-a-chip). The IMU/compass 323 may also allow other devices to query it for particular readings or other settings. But, as the IMU/compass 323 has become more common, application programming interfaces built on top of the IMU/compass 323 have also become more standardized, so that hardware level understanding of the operation of the IMU/compass 323 has becoming increasingly unnecessary. For example, modern IMU/compass 323 enable automatic recalibration to address potential drift issues, and often compensate in real-time for drift that is inherent in IMU/compass 323 operation with reliance upon internal calibration processes.

The global positioning system (GPS) 324 may or may not be a separate component. Also, though described as "GPS," the GPS 324 may rely in whole or in part upon other forms of location determination. This may include wireless assistance for location, GLONASS (the former USSR's GPS counterpart), or other systems. The GPS 324 provides a periodic update to the location of the mobile device 320 that may be used to derive the location of the device with some significant level of precision (within 10 meters, for example).

The AR display 325 is a display, such as a mobile device computer display, that may be used to show augmented reality content. The AR display 325 may be relatively standard mobile device display (e.g. a display for an iPhone® or similar device). In operation, software may direct the AR display 325 to "split screen" the AR display, showing two different perspectives, one for each eye, to enable the mobile device 320 to be used as a display in an AR "goggle" set. Alternatively, the AR display 325 may operate either sideways or upright, with the camera facing outward, as a single display, with both eyes seeing the same physical world and augmented reality through the display.

The camera 326 is a video and still-image camera, typically disposed on the back of the mobile device 320. The camera may, in fact, be multiple cameras. Some of those cameras may be infrared or edge-detecting cameras in addition to, or in place of, merely visual imagery cameras. For example, a camera array operating as camera 326 on the mobile device 320 may include multiple video cameras, separated by a small, known distance, which can be used to determined distances, and sizes of exterior objects being viewed by the camera. Likewise, an infrared camera (or cameras), LIDAR or LIDARs or other, similar technology, may be used to generate a three-dimensional image of the exterior physical world in front of the camera. The visual data from the video camera may be combined with depth-related three-dimensional data to generate a very accurate understanding of the physical world near the camera 326. This information may be used to intelligently place augmented reality objects "over" or "on top of" or in interaction with real-world objects. The camera 326 provides this data to the mobile device 320 and the mobile application 322.

The AR headset 330 includes functionality substantially similar to that of the mobile device 320. It is included to demonstrate that these functions are possible in different device formats. In addition to the AR headset 330, a tablet personal computer, virtual reality headsets with so-called "inside out" tracking and other, similar computing devices can also be used to implement these functions. As a result, the AR headset 330 includes a communications interface 331, a AR application 332 (similar to the mobile application 322), an inertial measurement unit/compass 333, global positioning system 334, AR display 335 and camera 336 that perform the same general functions described with regard to the mobile device 320.

The AR headset 330 components and functionality may, in some cases, be of a higher quality or incorporate more processing power than those of a mobile device 320 because the AR headset 330 may incorporate specialized hardware for performing the required functions that may or may not be present in the mobile device 320, for example, in situations in which the mobile device is a typical smartphone.

Description of Processes

Figure 4:
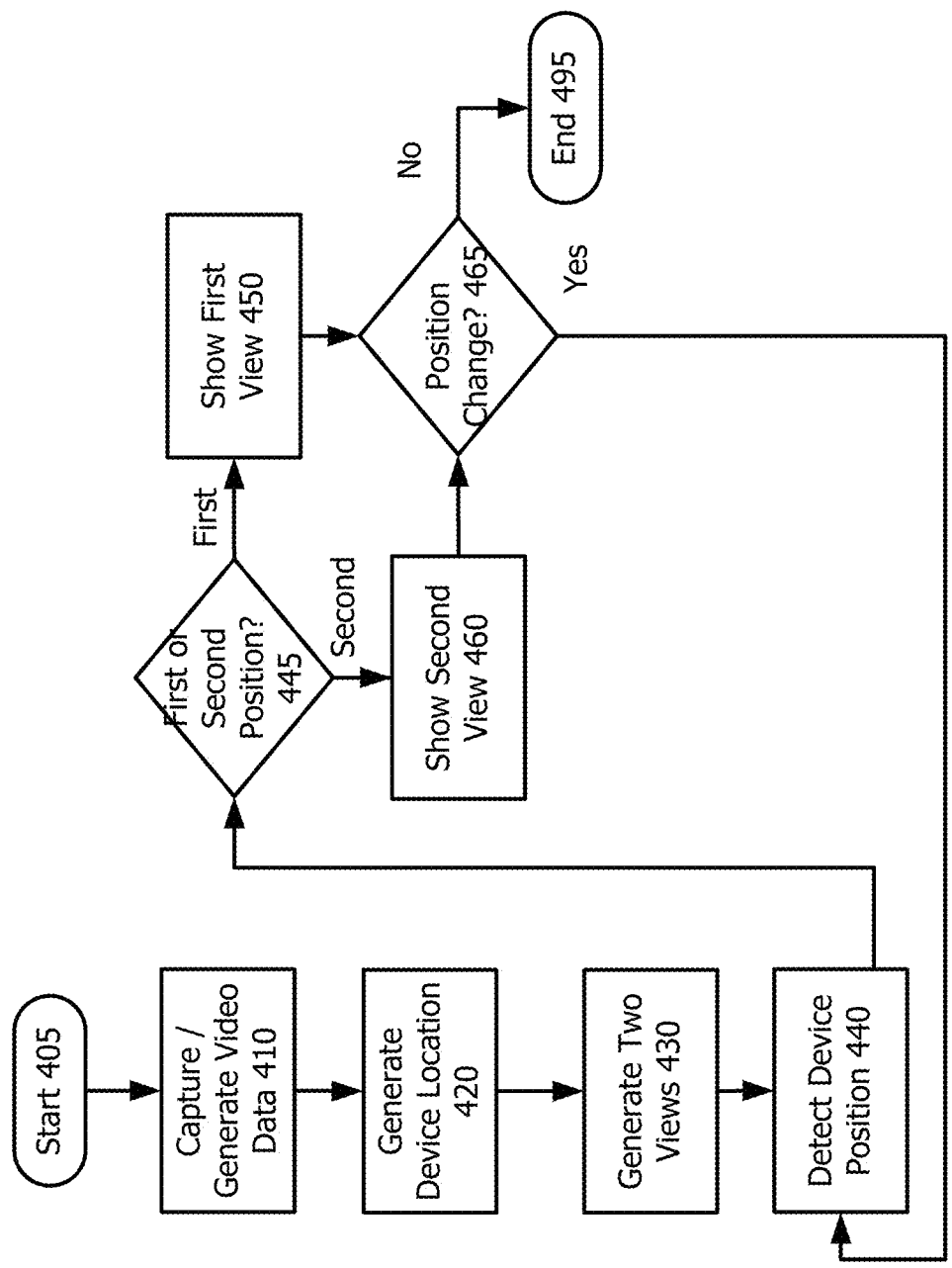
FIG. 4 is a is a flowchart of a process of providing and updating an augmented reality user interface.

Referring now to FIG. 4, a flowchart of a process of providing and updating an augmented reality user interface is shown. The flow chart has both a start 405 and an end 495, but the process may be cyclical in nature.

After the start 405, video data is captured and/or generated by the camera at 410. This video data is actual video of the physical world in front of the camera. The use of "generated" here envisions augmented reality systems that incorporate three-dimensional mapping technology such as infrared or LIDAR. In such systems, video data is captured by a conventional video camera, but additional data may be generated related to the scene based upon other sensors incorporated into the camera. The image data may be in the form of video stream of the current scene in front of the camera lens, such that reality is represented in that video stream. As discussed below, the video stream may be shown on the display in substantially real-time as it is being generated. Any associated depth or three-dimensional data may be presented to the mobile application at the same time.

Next, the device location is generated at 420. This may be done by, for example, the GPS 324 (FIG. 3). The location is used, as discussed more fully below, because the augmented reality system here is anchored within the physical world in a particular location and looking in a particular direction. As a part of this location data, the direction of the device (e.g. the direction the mobile device is oriented or the direction an augmented reality headset is facing) is also generated by the mobile device 320 or AR headset 330 (FIG. 3).

Once the location data, a stream of video data showing the physical world in front of the camera lens, and the directional data regarding the direction the camera is facing is generated and/or captured, then two views of the environment are generated at 430. The two views are two distinct augmented reality presentations of the same environment where the mobile device or augmented reality headset is presently being used.

The first view is a view of the physical world in front of the camera lens, when the mobile device or augmented reality headset is held "up" such that a line extending from the camera lens outward to a focal point of a lens of the camera is substantially parallel to the ground. The first view is composed of the view of the physical world combined with one or more augmented reality objects. For example, the objects may be characters, space ships, vehicles, signs, other individuals operating in the same augmented reality environment (e.g. other players). The objects may interact with the environment by speaking, attacking, firing projectiles, launching other vehicles or objects, and other similar interactions.

Notably, the augmented reality objects in the first view have actual locations that correspond to physical locations in the physical world. This is sufficiently accurate that, as a user turns his or her head while wearing an augmented reality headset or move his or her mobile device, the objects remain "fixed" relative to the physical world. As discussed above, in environments in which multiple players are in the same augmented reality environment simultaneously, the objects are fixed from the perspective of both players at the same location in the physical world.

Likewise, the augmented reality objects may have orientations and/or motion relative to the physical world. So, for example, an augmented reality car may be driving down a street directly toward a player holding a mobile device. The car is not actually present in the physical world, but the system may recognize a "street" and attempt to give the augmented reality car behaviors that correspond to a real street. As such, the car may be in an appropriate lane, heading in an appropriate direction, with an appropriate speed. If a user turns his or her mobile device around away from the augmented reality car on the actual, physical world street, he or she would cease seeing that car. But, that car still would continue in the augmented reality world moving and facing in a particular direction (e.g. cars normally travel in a forward motion relative to a driver sitting in them rather than sideways). Other augmented reality environment users may see that same car, travelling that same road, in the same direction and position in the correct lane.

In a different example, a series of augmented reality space craft may be floating in the physical world sky over portions of a city. This may be visible on a user's mobile device display. If a user turns his or her mobile device away from those space craft, they will continue to be present in their locations in the sky, with a certain altitude, a certain position, facing a particular direction, with any movement continuing to take place. This is because the position, orientation, altitude, actions, speed, and other characteristics of those objects are relative to the physical world and the mobile device is in a known position, orientation, and location, and facing a particular direction within that physical world. So, those augmented reality space craft may be presented relative to that mobile device and any other co-participating augmented reality devices.

The second view is a substantially top-down map view of the same environment. This map may have three dimensions and may be presented as a perspective view or as a combined real-image, three-dimensional view of the environment. But, notably, the second view incorporates a map or overview of the physical world with the same augmented reality objects that were present in the first view, now visible in a map view. The map view augmented reality objects will continue to have the same characteristics that were present in those same objects in the first view. These characteristics include orientation within the physical world (e.g. facing North), the same speed, and the same location, though that location is now represented within the map view, rather than the physical world first view.

The second view may be presented from the perspective of the mobile device's current location (e.g. looking outward across a map of the world with the augmented reality device or mobile device's current location) or may be presented as a top-down view with the mobile device or augmented reality headset at the center, showing that mobile device or augmented reality headset's location on the map. However, the augmented reality objects remain fixed, relative to the physical world, not the mobile device or augmented reality headset, when, at the user's request, the views are changed. The change of views is discussed below.

Once the two views are rendered, and these views continue to be rendered indefinitely while the augmented reality experience continues, the position of the mobile device or augmented reality headset is detected at 440. Specifically, whether the mobile device or augmented reality headset camera is held at an orientation where a line extending from the camera lens outward to a focal point of a lens of the camera is substantially parallel to the ground or such that the camera is held at an orientation where a line extending from the camera lens outward to a focal point of a lens of the camera is substantially perpendicular to the ground is determined.

Once the position is detected at 440, a determination of whether the first or second position is detected is made at 445. If the line is substantially parallel to the ground ("first" at 445), meaning that the mobile device or augmented reality headset user is looking "up" or at least primarily parallel to the ground, then the first view may be shown on the display at 450. If the line is substantially perpendicular to the ground ("second" at 445), meaning that the user is looking "down" or at least primarily perpendicular to the ground, then the second view may be shown on the display at 460.

The word "substantially" is used herein to mean that the mobile device or augmented reality headset is more than a predetermined threshold in one orientation as opposed to the other. So, for example, if the device is at a 45 degree angle, relative to the ground, then the device may still be looking "down" and the second view may be being shown. Other thresholds are possible, such that anything over 60 degree angle, relative to the ground, is "up" while anything less than that is "down." The exact threshold is not particularly relevant. In some cases, the views may be inverted. For example, looking "up" to the sky itself may cause a "space map" second view to load apparently "above" a user, whereas looking below 80 degrees, relative to the ground, may cause an invading, augmented reality space army to appear within the physical world of the first view. Regardless, there are thresholds around when a first view or a second view, both with augmented reality objects tied to physical locations in the physical world, with real orientations, speeds, and the like, are shown to a user of a mobile device or augmented reality headset. When one threshold is met, then the view changes. Once that threshold is met again in the opposite direction, the view changes back again. In some cases, there may be multiple thresholds, each with different associated views, and each including augmented reality objects tied to physical locations.

Preferably, the transitions between these two views are seamless. So, as a user's head wearing an augmented reality headset moves downward (or a mobile device is moved so that its display moves downward), the map view dynamically moves into the field of view of the individual in such a way that it feels as though it corresponds to the movement. So, the map moves into view in synchronicity with the movement of the device. Similarly, the map view may "fade in" as the user moves the device downward and "fade out" as the user moves the device upward. This is because the map view is primarily a view of augmented reality objects, whereas the other view is of both objects in the physical world with augmented reality objects superimposed therein. In this way, the two views appear to flow naturally from one another and are presented automatically based upon user (or device) head motion, without requiring further user interaction.

This transition may be made by "fading in" one user interface or view while simultaneously "fading out" another. Or, or in addition, one view may "disappear into the sky within the scene, while another "rises" from below the user (e.g. a map). In these ways, or other ways, the visibility of the views may be dynamic relative to the user's head or the device's position with a gradual change during the transition between the two distinct views that may appear quite natural to a user.

Once presented, either view may have user interface and other interactive elements associated therewith that may be distinct across each view. So, for example, while in the outward looking view including spaceships, a user may be able to fire at those spaceships or to communicate with them by a "radio" system or text communications. While in the downward facing view, the user may be able to interact with the ships by clicking on them, to move the "user's" objects (e.g. other ships) around in the environment or to instruct them to move around in the environment. The results of those actions may be reflected in both views. However, the systems for interaction may change dynamically based upon the user's transition between the various views such that interactions in one view (e.g. clicking a screen or selecting a button or object) have different functions in another.

Figure 5:
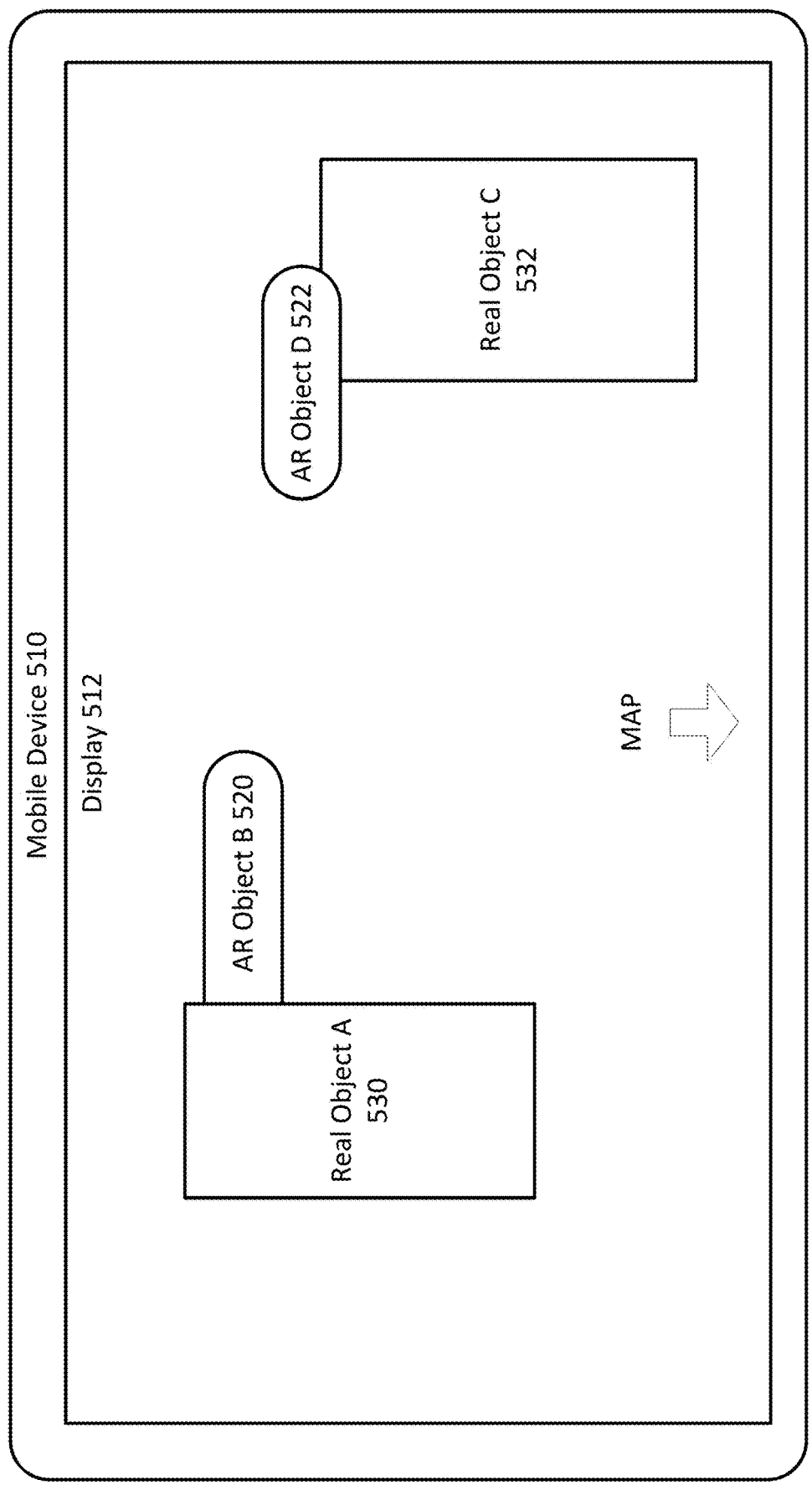
FIG. 5 is a is an example of a first view of an augmented reality user interface.

FIG. 5 is a is an example of a first view of an augmented reality user interface. This view is a "first view" of a user looking outward at the real world and seeing real objects displayed on the display 512 based upon image data (and other data) captured by a camera. The AR user interface is shown on a display 512 of a mobile device 510, though, it could be on an augmented reality headset as well. A real object A 530 is shown with an augmented reality object B 520 "behind" it. This may take place because the augmented reality object B 520 is known to be in a physical location, relative to real object A 530 that is further away from the mobile device 510.

Simultaneously, augmented reality object D 522 is shown as "in front of" real object C 532. Again, this may be because the augmented reality object D has a known position within the physical world that is closer to the mobile device 510 than the real object C 532. Each of the augmented reality objects B 520 and D 522 may have speed, orientations, capabilities, positions, pitches, yaws, rotations, and the like. So, they may be continually updated and may, at some point, pass in front of or through other real-world objects, depending on their movement relative to the physical world.

An instruction may be superimposed on the screen directing the user to look downward or to tilt his or her device downward to see the map as shown near the bottom of the display 512.

Figure 6:
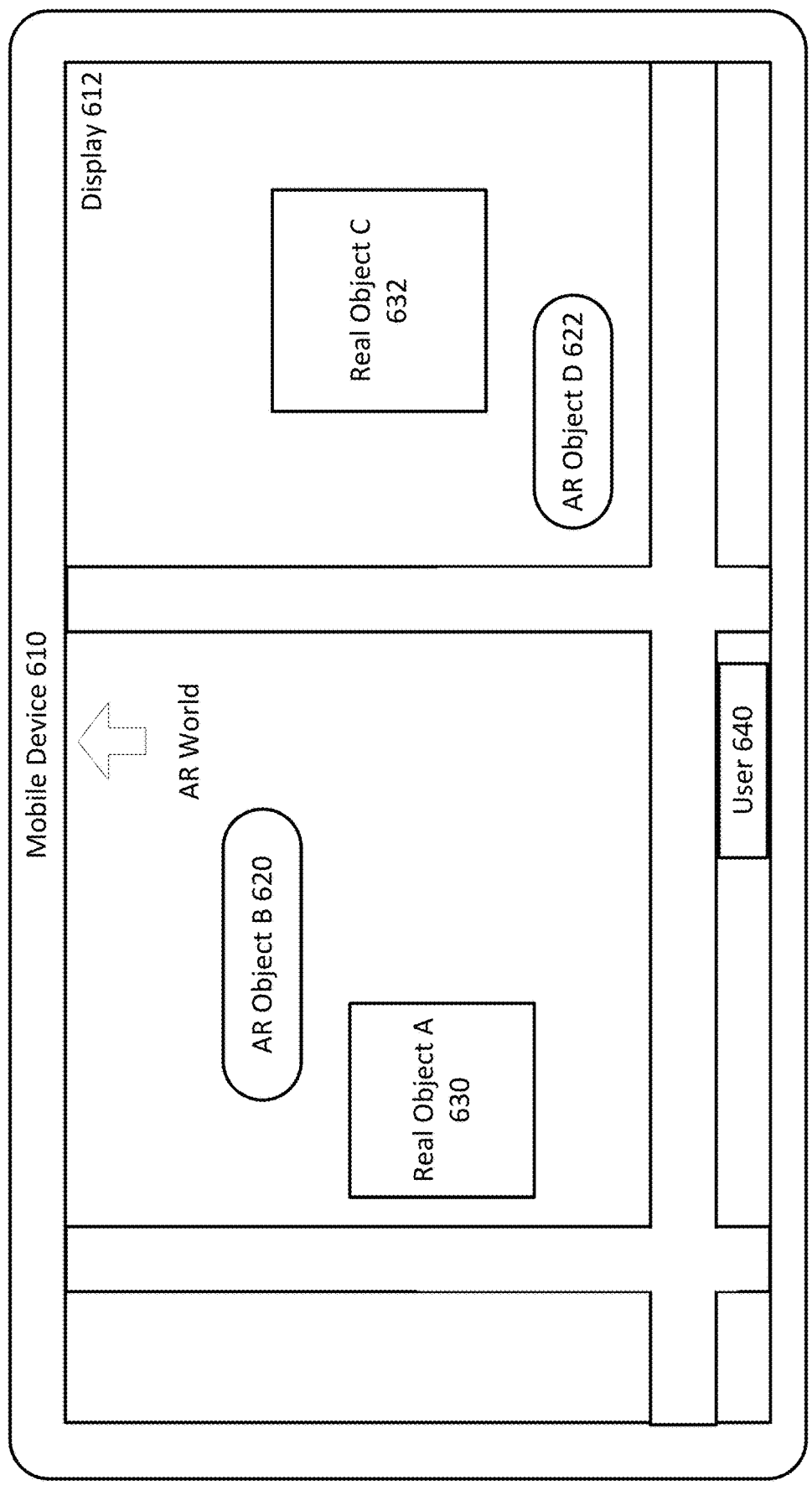
FIG. 6 is an example of a second view of an augmented reality user interface.

FIG. 6 is an example of a second view of an augmented reality user interface. This is a top down view of a map of the same physical location as FIG. 5, also showing the relative position of the user 640 (i.e., the user's mobile device 610). As can be seen, the same display 612 has now been tilted "downward" in this case, such that this map overview is now provided. The real object A 630 can now be seen as actually "in front of" the augmented reality object 620, relative to the user 640. Similarly, real object C 632 can be seen as "behind" the augmented reality object D 622, relative to the user 640. Also, the general orientation (e.g. longways) may be seen in these augmented reality objects B 620 and D 622. That information is maintained across views.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for augmented reality user interface interactions comprising:
   a first computing device including a processor configured to generate a first augmented reality video based upon a first physical location of the first computing device within a physical environment, wherein the first augmented reality video comprises a first view comprising first video data from a camera of the first computing device and an augmented reality object superimposed on the first video data such that the augmented reality object appears to move within the physical environment with a first speed and a first orientation relative to the physical environment, with a behavior corresponding to an identified physical object represented in the first video data, and independent from movement of the first computing device, and wherein the first augmented reality video further comprises a second view that indicates a first location of the augmented reality object relative to the first computing device and the first speed and the first orientation of the augmented reality object relative to the physical environment,
   wherein the physical object is identified using a location of the physical object.

2. The system of claim 1, further comprising a server, wherein the first computing device includes a network interface, and wherein the processor of the first computing device is configured to obtain object data for the augmented reality object from the server, wherein the object data comprises the first speed and the first orientation of the augmented reality object.

3. The system of claim 1, wherein the processor of the first computing device is configured to generate the first augmented reality video with a perspective shift in both the first view and the second view responsive to detecting movement of the first computing device from the first physical location to a second physical location.

4. The system of claim 1, wherein the first computing device is configured to output the first view to a display responsive to detecting that the first computing device is in a first device orientation, wherein the first device orientation is such that a line extending from a lens of the camera outward to a focal point of the lens is substantially parallel to the ground.

5. The system of claim 4, wherein the first computing device is configured to output the second view to the display responsive to detecting that the first computing device is in a second device orientation, wherein the second device orientation is such that the line extending from the lens of the camera outward to the focal point of the lens is substantially perpendicular to the ground.

6. The system of claim 5, wherein the first computing device is configured to transition from outputting the first view to outputting the second view by gradually increasing visibility of the second view while gradually decreasing visibility of the first view responsive to detecting movement of the first computing device from the first device orientation to the second device orientation.

7. A non-volatile machine-readable storage medium comprising instructions configured to cause a processor to:
receive, from an inertial measurement unit of a first computing device, data indicative of movement and orientation of the first computing device;
  receive, from a camera of the first computing device, first video data representing a portion of a physical environment visible from a lens of the camera;
  identify, based on location data, a first physical location of the first computing device in the physical environment;
  identify a physical object in the portion of the physical environment represented in the first video data, wherein the physical object is identified using a location of the physical object;
  obtain object data indicating a virtual location, a speed and an orientation of an augmented reality object in a virtual environment that corresponds to the physical environment, wherein the object data further indicates a behavior of the augmented reality object corresponding to the identified physical object;
  generate a first view comprising the first video data and a representation of the augmented reality object superimposed over the first video data such that the representation appears to be within the physical environment at an apparent physical location corresponding to the virtual location and appears to move independently from movement of the first computing device and relative to the physical environment with the speed and the orientation of the augmented reality object in the virtual environment and with the behavior corresponding to the identified physical object; and
  generate a second view indicating the apparent physical location of the augmented reality object within the physical environment relative to the first physical location of the first computing device,
  the second view further indicating the speed and the orientation of the augmented reality object relative to the physical environment.

8. The non-volatile machine-readable storage medium of claim 7, further comprising instructions that cause the processor to:
  obtain the object data for the augmented reality object from a server using a network.

9. The non-volatile machine-readable storage medium of claim 7, further comprising instructions that cause the processor to:
  detect movement of the first computing device from the first physical location to a second physical location; and
  regenerate the first and second views with a perspective shift responsive to the detected movement.

10. The non-volatile machine-readable storage medium of claim 7, further comprising instructions that cause the processor to:
  detect a device orientation of the first computing device, and
  output the first view to a display responsive to determining that the first computing device is in a first device orientation,
  wherein the first device orientation is such that a line extending from a lens of the camera outward to a focal point of the lens is substantially parallel to the ground.

11. The non-volatile machine-readable storage medium of claim 10, further comprising instructions that cause the processor to:
  output the second view to the display responsive to determining that the first computing device is in a second device orientation,
  wherein the second device orientation is such that the line extending from the lens of the camera outward to the focal point of the lens is substantially perpendicular to the ground.

12. The non-volatile machine-readable storage medium of claim 11, further comprising instructions that cause the processor to:
  transition from outputting the first view to outputting the second view by gradually increasing visibility of the second view and gradually decreasing visibility of the first view, responsive to detecting movement of the first computing device from the first device orientation to the second device orientation.

13. A method for augmented reality user interface interactions, the method comprising:
  receiving first video data of a physical environment from a camera of a first computing device;
  identifying a first physical location of the first computing device;
  identifying a physical object represented within the first video data using a location of the physical object;
  generating a first view including the first video data from a camera of a first computing device and an augmented reality object superimposed over the first video data such that the augmented reality object appears to move in a first direction, with a behavior corresponding to the physical object represented in the first video data, independent from movement of the first computing device, and with a first speed relative to the physical environment;
  generating a second view indicating an apparent physical location of the augmented reality object within the physical environment relative to the identified first physical location and indicating the first direction and first speed of the apparent movement of the augmented reality object within the physical environment; and
  generating an augmented reality video comprising the first view and the second view.

14. The method of claim 13, wherein generating the first view comprises obtaining object data for the augmented reality object from a server using a network, and wherein the object data comprises the first direction and first speed.

15. The method of claim 13, further comprising:
  detecting that a component of the first computing device is in a first orientation, and
  outputting the augmented reality video for display by a display of the first computing device such that the first view is visible,
  wherein the first orientation is such that the camera is held at an orientation where a line extending from a lens of the camera outward to a focal point of the lens of the camera is substantially parallel to the ground.

16. The method of claim 15, further comprising:
detecting that the component of the first computing device is in a second orientation, and
outputting the augmented reality video for display by the display of the first computing device such that the second view is visible,
wherein the second orientation is such that the line extending from the lens of the camera outward to the focal point of the lens is substantially perpendicular to the ground.

17. The method of claim 15, further comprising:
detecting that the component of the first computing device is moving between the first orientation and a second orientation, and outputting, in response to the detecting that the first computing device is moving between the first orientation and the second orientation, the augmented reality video to the display of the first computing device such that the first view and the second view are both partially visible.

18. The method of claim 15, further comprising detecting that the component of the first computing device is moving from the first orientation to a second orientation, and transitioning from outputting the augmented reality video for display by the display of the first computing device such that the first view is visible to outputting the augmented reality video for display by the display of the first computing device such that the second view is visible.

19. The method of claim 17, wherein the component of the first computing device comprises an augmented reality headset.

20. The method of claim 18, wherein the transitioning from outputting the augmented reality video for display by the display of the first computing device such that the first view is visible to outputting the augmented reality video for display by the display of the first computing device such that the second view is visible comprises fading out the first view and fading in the second view.

* * * * *